(12) United States Patent
Chen et al.

(10) Patent No.: US 8,295,263 B1
(45) Date of Patent: Oct. 23, 2012

(54) TRIGGERING AND TRANSMITTING SOUNDING PACKETS FOR WIRELESS COMMUNICATIONS

(75) Inventors: Chin Hung Chen, Tainan (TW); Ning Zhang, Saratoga, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 614 days.

(21) Appl. No.: 12/367,119

(22) Filed: Feb. 6, 2009

(51) Int. Cl.
*H04J 3/00* (2006.01)

(52) U.S. Cl. ........................................ 370/345

(58) Field of Classification Search .................. 370/310, 370/345, 431, 445; 375/259, 260, 267; 455/73, 455/550.1, 561, 562.1
See application file for complete search history.

(56) References Cited

U.S. PATENT DOCUMENTS

| | | | |
|---|---|---|---|
| 6,449,266 B1 | 9/2002 | Hottinen et al. | |
| 6,895,253 B1 | 5/2005 | Carloni et al. | |
| 6,917,820 B2 * | 7/2005 | Gore et al. | 455/562.1 |
| 7,239,893 B2 * | 7/2007 | Yang | 455/561 |
| 7,400,907 B2 * | 7/2008 | Jin et al. | 455/562.1 |
| 7,746,943 B2 * | 6/2010 | Yamaura | 375/260 |
| 7,747,250 B2 | 6/2010 | Larsson et al. | |
| 7,920,533 B2 * | 4/2011 | Koo et al. | 370/338 |
| 8,175,538 B1 | 5/2012 | Chen et al. | |
| 2003/0096618 A1 | 5/2003 | Palenius | |
| 2005/0002353 A1 | 1/2005 | Horneman | |
| 2005/0141545 A1 * | 6/2005 | Fein et al. | 370/445 |
| 2005/0287978 A1 | 12/2005 | Maltsev et al. | |
| 2006/0098580 A1 * | 5/2006 | Li et al. | 370/245 |
| 2006/0252386 A1 | 11/2006 | Boer et al. | |
| 2007/0195974 A1 | 8/2007 | Li et al. | |
| 2007/0286303 A1 * | 12/2007 | Yamaura | 375/267 |
| 2008/0247370 A1 * | 10/2008 | Gu et al. | 370/338 |
| 2009/0080560 A1 * | 3/2009 | Na et al. | 375/267 |
| 2009/0086690 A1 * | 4/2009 | Gu et al. | 370/338 |
| 2009/0196372 A1 * | 8/2009 | Zhang et al. | 375/267 |
| 2010/0172425 A1 * | 7/2010 | Pare et al. | 375/260 |
| 2011/0150066 A1 * | 6/2011 | Fujimoto | 375/224 |

* cited by examiner

*Primary Examiner* — Chi Pham
*Assistant Examiner* — Robert Lopata
(74) *Attorney, Agent, or Firm* — Bever, Hoffman & Harms, LLP

(57) ABSTRACT

A process for determining when sounding packets are to be triggered and transmitted in a wireless beamforming system is disclosed. In one embodiment, a timer is programmably set to adapt to the operating environment. Whenever the timer elapses, a sounding packet is triggered and the timer resets. In another embodiment, the sounding packet is triggered by comparing measured correlations of channel characteristics against a programmable correlation threshold. If a measured correlation falls below the correlation threshold, this indicates that the channel has undergone a relatively large change. In response, a new sounding packet is triggered to update the beam steering matrix. Otherwise, the previous beam steering matrix is still used. Thereby, sounding packets are expeditiously triggered to keep the beam steering matrix updated with minimal impact to the over-the-air bandwidth.

29 Claims, 6 Drawing Sheets

TRIGGERING AND TRANSMITTING SOUNDING PACKETS FOR WIRELESS COMMUNICATIONS

BACKGROUND OF THE INVENTION

1. Field of the Invention

Embodiments of the present invention generally relate to wireless communications. More particularly, the present invention pertains to an apparatus and method for determining when to trigger and transmit sounding packets used to characterize the channel in a transmit beamforming system.

2. Description of the Related Art

Transmit beamforming (TxBF) technology entails using multiple, separate antennas to transmit single or multiple signal streams to a receiver. The raw data signals are properly weighted and combined for each of the transmitter's antennas so that a transmit beam is formed and directed to the receiver. The intent is to have all of the transmitted raw data signals from the multiple antennas coherently combine at the receiver. By tightly focusing the wireless data signals at the receiver, the transmitter's range is effectively extended and higher data rates are made possible.

In practice, the wireless data signals oftentime encounter a variety of scatters. These sources of scattering are unpredictable and variable in nature. For example, objects (e.g., buildings, walls, furniture, fixtures, etc.) in the way of a wireless data signal, may cause the wireless data signal to be reflected in multiple, different directions. The result is that the original transmitted wireless data signal may ultimately reach the receiving antenna by way of two or more different paths. This propagation phenomenon is referred to as "multipathing." Conventionally, scattering is treated as a problem because a single transmitted wireless signal can exhibit different delays (e.g., phases) and magnitudes as experienced by the receiver, depending on the different paths that were traveled.

Although scattering and multipathing cannot be eliminated, their effects can be measured and then factored into the calculations when determining the beamforming matrix. One way to accomplish this entails a process whereby the wireless channel's specific characterizes are measured. Based on the channel information, the transmitter can pre-process the raw data signals so as to compensate for the specific channel characteristics. One method for determining the channel characteristics is set forth by the Institute of Electrical and Electronics Engineers (IEEE) in 802.11n. In 802.11n, a set of standards is defined for wireless networking (e.g., Wi-Fi) that is widely adopted by the wireless communications industry. In 802.11n, sounding packets are transmitted to the receiver. The sounding packets contain training symbols that, upon receipt by the receiver, are interpreted to characterize the channel. Based on the calculated channel characteristics, a beamforming matrix or vector can be applied to weight and combine the raw data signals. Thereby, the wireless data signals can be coherently combined at the receiver, even in the presence of interferences and multipathing.

Under some operating conditions, the environment is fairly static (e.g., indoors). In these cases, the channel stays fairly constant, and the originally calculated channel characteristics are slowly varying over time. And because the originally calculated channel characteristics are slowly changing, they can be used over longer periods of time with minor or negligible performance degradation. Consequently, the times between re-transmitting sounding packets to update the channel characteristics can be extended. However, there may be operating conditions whereby the environment is rapidly changing. In these circumstances, the channel characteristics can be radically different from one moment to the next. It is imperative that sounding packets be more frequently re-transmitted in order to obtain more accurate, up-to-date channel characteristics. Otherwise, the performance may suffer to the point of losing the benefits of TxBF altogether. Unfortunately, there is a cost associated with transmitting sounding packets. Sounding packets consume valuable bandwidth. In other words, user data cannot be sent while sounding packets, sounding long training fields (LTFs), or feedbacks to sounding packets (e.g., CSI/V/CV) are being transmitted As a result, TxBF designers are faced with a dilemma. On the one hand, transmitting fewer sounding packets reserves airtime to be better utilized for the transmission of user data. The downside is that performance may suffer, especially in a rapidly changing environment. On the other hand, the frequent transmissions of sounding packets lead to improved performance. However, frequent transmissions of sounding packets consumes valuable bandwidth. Further complicating matters is that an otherwise stable operating environment may occasionally undergo abrupt and rapid changes. Conversely, a rapidly changing environment may encounter periods of stability. Moreover, the TxBF system, itself, could be moved from a stable environment to a rapidly changing environment or vice versa. Thus, there does not seem to be a simple, one-size-fits-all solution to this problem.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

Embodiments of the present disclosure pertain to a process for determining when sounding packets are to be triggered and transmitted in a wireless beamforming system. In one embodiment, a timer is programmably set to adapt to the operating environment. Whenever the timer elapses, a sounding packet is triggered and the timer resets. For stable environments, the timer is set for a longer duration. This reduces the frequency of sounding packets, thereby conserving valuable over-the-air bandwidth. In unstable or rapidly changing environments, the timer is set for a shorter duration. This results in the beam steering matrix being updated more frequently, thereby ensuring optimal performance.

In another embodiment, sounding packets are triggered by comparing measured correlations of particular channel characteristics against a pre-determined correlation threshold. The measured correlations can be between the channel estimation of a CSI/V/CV feedback packet and the channel estimation of an ACK packet; the channel estimation of the ACK packet corresponding to the first steered packet and the channel estimation of the uplink sounding packet; or the channel estimation of the ACK packet corresponding to the first steered packet and the channel estimations of successive ACK packets. If the measured correlation falls below the correlation threshold, this indicates that the channel has undergone a relatively large change. In response, a new sounding packet is triggered to update the beam steering matrix. Otherwise, if the measured correlation does not fall below the correlation threshold, this is taken to indicate that the channel is relatively stable. A new sounding packet is not triggered at this time, and the previously calculated beam steering matrix is still applied. Thereby, sounding packets are expeditiously triggered on an as-needed basis to keep the beam steering matrix updated, while minimizing the impact to the over-the-air bandwidth.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Figure 1:
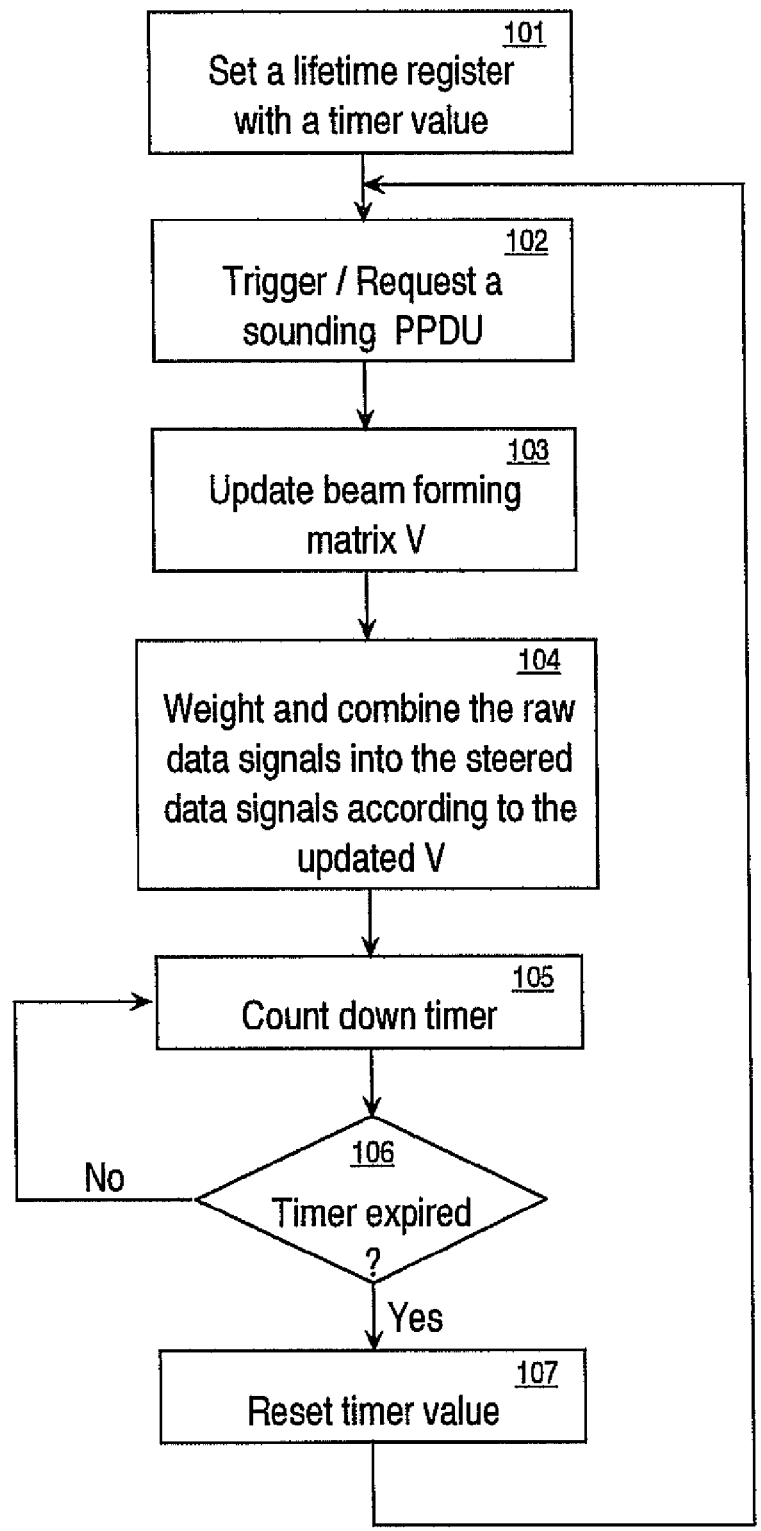
FIG. 1 is a flowchart description of an adaptive, programmable process for determining how often the sounding packets are to be triggered.

In one embodiment, a timer is programmably set to a desired time interval. Sounding packets are triggered based on this timer. More specifically, FIG. 1 is a flowchart description of an adaptive, programmable process for determining how often the sounding packets are to be triggered according to this particular embodiment. Initially, a lifetime register is programmed with a timer value in step 101. This timer value determines the time interval between when sounding PPDU's are triggered. The PPDU is a PLCP Protocol Data Unit, whereby PCLP refers to the Physical Layer Convergence Protocol. For environments that are stable (e.g., indoors), the timer value can be set longer. Setting the timer value for a longer duration under these circumstances is advantageous because it reduces the overhead associated with the transmissions of sounding PPDU's. Conversely, for environments that are subject to rapid changes (e.g., mobile or outdoor), the timer value can be set shorter. Setting the timer value for a shorter duration under these circumstances is advantageous because it keeps the performance from degrading. Consequently, the Multiple-Input Multiple-Output (MIMO) system can be programmed to adapt to a wide range of applications.

In the explicit beamforming mode, the transmitter, referred to herein as the "beamformer," is triggered to send the sounding PPDU to the receiver, herein referred to as the "beamformee" in step 102. In response, the beamformee generates or updates the beamforming matrix V to the beamformer via the CSI/V/CV packet in step 103. In the implicit beamforming mode, the beamformer is triggered to requests the sounding PPDU in step 102. In response, the beamformee sends the sounding PPDU to the beamformer to update the beamforming matrix V in step 103. The beamforming matrix, V, is derived from the channel matrix H based on the received sounding PPDU. Step 104 weights and combines the raw data signals into the steered data signals according to the updated V. The timer value is counted down in step 105 until it expires as determined by step 106. Once the timer expires, the timer value is reset, and the process begins anew with step 102. Thereby, sounding PPDU's are triggered and beamforming matrices are efficiently updated at pre-programmed time intervals, depending on the operating environment. The time intervals are programmed to adapt to individual MIMO system's operating environment.

In another embodiment, sounding packets are triggered based on correlations between channel estimation results. This embodiment is applicable to explicit beamforming systems. In an explicit beamforming system, the beamformer (BFer) transmits a sounding PPDU to the beamformee (BFee). Based on the sounding PPDU, the beamformee can estimate the channel characteristics. Once the channel characteristics have been estimated, the Channel State Information (CSI) is transmitted back to the original beamformer. This is referred to as explicit beamforming because the channel is explicitly computed by the beamformee and then transmitted back to the original beamformer. The beamformer can then perform computations to determine the beamforming matrix, V. Alternatively, the beamformee can perform the beamforming matrix calculations. The calculated V is then transmitted back to the original beamformer. For improved efficiency, the beamformee can compress the beamforming matrix. The compressed beamforming matrix, CV, is transmitted back to the original beamformee. The CSI/V/CV is used to weight and combine the raw data signals into the beamformed data signals. Upon receipt of a valid beamformed data packet, the beamformee sends back an acknowledgment packet (ACK) to the beamformer, indicating successful receipt of the data packet.

In this embodiment, the normal course of CSI/V/CV packet and ACK packet transmissions between the beamformer and beamformee is advantageously exploited for purposes of determining when to trigger the transmission of sounding packets. Basically, the channel estimation results of the CSI/V/CV packet are correlated against the channel estimation results of current and subsequent ACK packets. This correlation is used to determine when sounding packets are to be triggered. Consequently, by utilizing existing packet exchanges in this unique and novel way, the optimal manner by which sounding packets are to be transmitted can be attained with no additional overhead burden being imposed.

Figure 2:
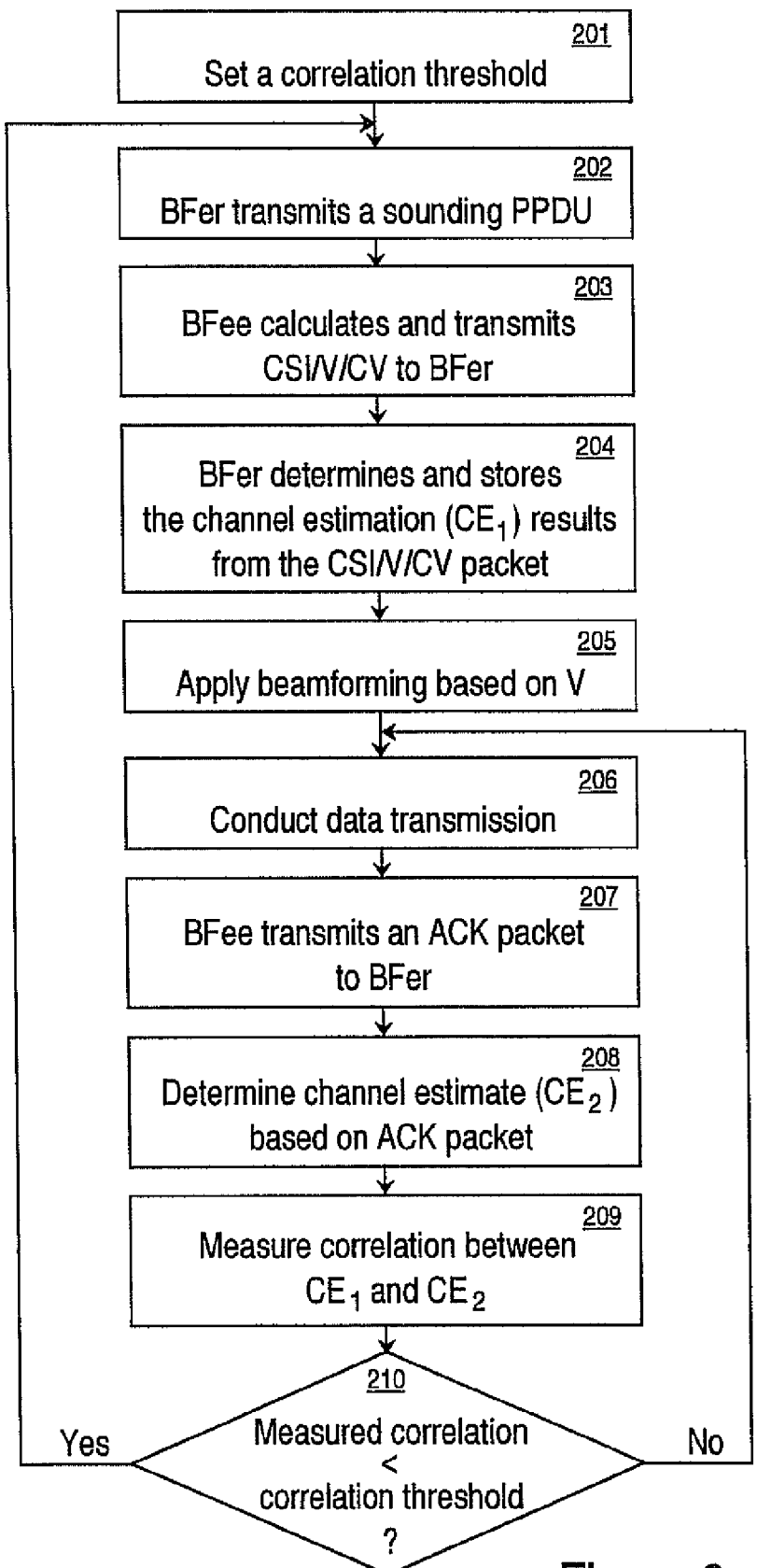
FIG. 2 shows a flowchart description of the process for determining when to trigger sounding packets based on correlations between channel estimation results of CSI/V/CV and ACK packets.

More particularly, FIG. 2 shows a flowchart description of the process for determining when to trigger sounding packets based on correlations between channel estimation results of CSI/V/CV and ACK packets. Initially, a correlation threshold is set in step 201. The correlation threshold can be set at a fixed value or can be programmably changed so as to give an administrator control over the sensitivity. The beamformer transmits a sounding PPDU in step 202. The beamformee receives the PPDU packet and computes the CSI, V, or CV (CSI/V/CV) information back to the beamformer, step 203. The beamformer determines and stores the channel estimation ($CE_1$) results based on the CSI/V/CV packet in step 204. In step 205, the raw data signals are beamformed according to the CSI/V/CV information. Once properly beamformed, the transmission of data packet(s) over these antennas are conducted in step 206. Upon successful receipt of a data packet, the beamformee transmits an acknowledgment (ACK) packet back to the original beamformer in step 207.

The beamformer, in step 208, determines the channel estimate ($CE_2$) based on the received ACK packet. A correlation measurement is made in step 209 between the stored $CE_1$ and the current $CE_2$. Basically, the correlation is an indication of how closely $CE_2$ resembles $CE_1$. A high correlation indicates that $CE_2$ is similar to $CE_1$. This is interpreted to mean that the channel has not substantially changed between the receiving of the CSI/V/CV packet and the latest ACK packet. Consequently, the current channel matrix, H, and beamforming matrix, V, although stale, can still be used. A low correlation indicates that $CE_2$ is relatively different from $CE_1$. This is interpreted to mean that the channel has changed by such a degree, between the receiving of the CSI/V/CV packet and the latest ACK packet, that the current channel matrix, H, and beamforming matrix, V, may no longer valid. This indicates that a new sounding PPDU should be triggered to initiate updated CSI/V/CV information. This process is shown in step 209. If the measured correlation between $CE_1$ and $CE_2$ is less than the correlation threshold, then the process proceeds to step 202, whereby the beamformer is triggered to transmit a new sounding PPDU. Otherwise, if the measured correlation between $CE_1$ and $CE_2$ is greater than or equal to the correlation threshold, the process proceeds to step 206. No new sounding PPDU is triggered at this point. Thus, this embodiment automatically adjusts the intervals between when sounding PPDU's are triggered depending upon the system's particular environment.

It should be noted that the process is not limited to performing a correlation for each ACK packet. The process can be adapted to perform correlations on every second, third, etc. ACK packet. The process can also be programmed to perform correlations on ACK packets depending on prior history results. For example, if the correlation threshold is frequently being missed, correlation measurements can be performed more routinely on received ACK packets (e.g., correlations performed for each ACK packet). Otherwise, if the correlation measurements show that the correlation threshold is not missed, then correlations may be performed less frequently (e.g., correlations performed for every fifth ACK packet). This enables the process to dynamically adapt to its current operating environment. Furthermore, embodiments of the invention are not limited to the family of 802.11 standards, nor is it limited to PPDU sounding packets. Embodiments can be applied to any wireless protocol, standard, or format that transmits packetized or non-packetized information over-the-air that is used to directly or indirectly determine the channel.

In one embodiment, instead of correlating channel estimation results between the CSI/V/CV and ACK packets, the correlation is performed on two different ACK packets. This embodiment can be applied to both explicit beamforming systems as well as implicit beamforming systems. An explicit beamforming system was described in detail above. In an implicit beamforming system, the beamformee does not explicitly transmit the channel information back to the beamformer. Instead, the beamforming matrix, V, is calculated or determined based on the principle that the forward channel (i.e., the channel from the beamformer to the beamformee) is reciprocal to the reverse channel (i.e., the channel from the beamformee to the beamformer). The reciprocity is achieved if calibrations are performed to account for gain and/or phase impairments and coupling losses inherent between the forward and reverse channels. More specifically, the beamformer can use received signals (e.g., the preambles) from the beamformee to calculate the channel matrix of the reverse channel, $H_{Reverse}$. A matrix transpose is then applied to estimate the forward channel matrix $H_{Forward}$. The actual beamforming matrix, V, can then be calculated based on the derived forward channel matrix, $H_{Forward}$. Consequently, implicit beamforming eliminates the exchange overhead of CSI/V/CV. However, this is accomplished at the expense of increased computations to derive the beamforming matrix V at the local side.

In general, sounding packets are determined to be transmitted by setting a correlation threshold. At least two raw channel estimations are processed to determine two corresponding channel characteristics. This process can include filtering, transforming, or mapping procedure(s) to improve the correlation accuracy. The correlation is then measured between the two channel characteristics to obtain a measured correlation. A determination is made as to whether the measured correlation is less than the correlation threshold. A sounding packet is transmitted to update the beamforming matrix if the measured correlation is less than the correlation threshold.

Figure 3:
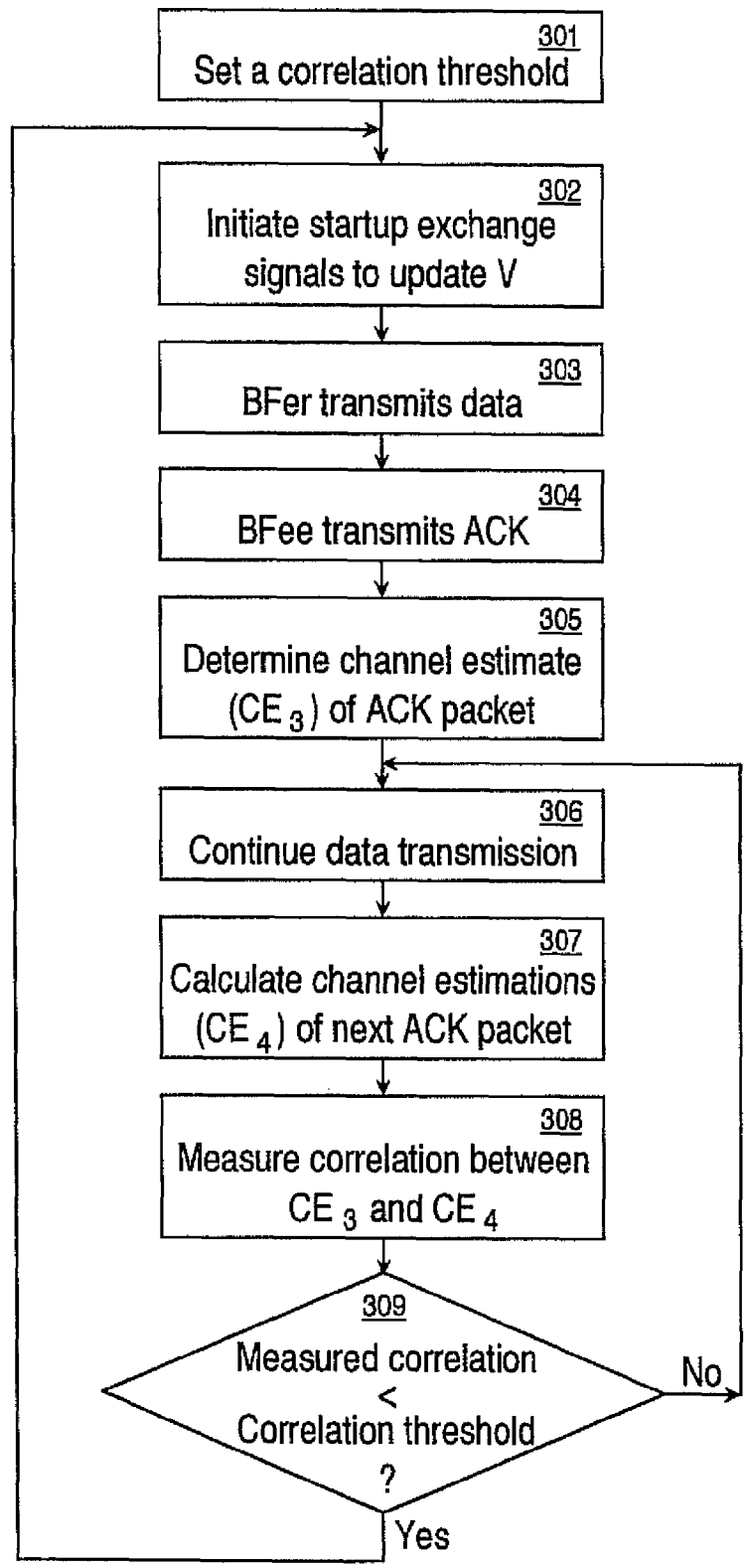
FIG. 3 is a flowchart describing in detail one embodiment of determining when sounding packets are triggered based on correlations between channel estimations of ACK packets.

FIG. 3 is a flowchart describing in detail one embodiment of determining when sounding packets are triggered based on correlations between channel estimations of ACK packets. This process is applicable to both explicit as well as implicit beamforming systems. Initially, a correlation threshold is set in step 301. This correlation threshold serves as a baseline in determining when sounding packets are to be triggered and transmitted. The beamforming system initiates the startup sequence of exchange signals in preparation for data transmissions in step 302. This startup sequence can be part of either an explicit or implicit beamforming process. Once the beamforming matrix, V, is calculated as part of the startup process, the beamformer transmits its first steered data packet in step 303. The beamformee receives the data packet and transmits an acknowledgment (ACK) back to the original beamformer in step 304 as a reply. The beamformer can determine a channel estimation ($CE_3$) based on the received ACK packet, step 305. The first $CE_3$ is the channel estimation of the ACK associated with the first steered packet. The transmission of data packets continues in step 306. For each data transmission, the beamformee transmits a reply ACK to the beamformer. The beamformer, in step 307, calculates the channel estimation ($CE_4$) of each successive, received ACK.

In step 308, the correlation between $CE_3$ and $CE_4$ is measured. This correlation measurement portrays the degree by which the channel has changed between the times when those ACK packets were sent. A high correlation means that the channel has remained relatively stable. Conversely, a low correlation means that the channel has undergone a relatively large change. A determination is made in step 309 as to whether the measured correlation of step 308 is less than the correlation threshold. If the measured correlation is not less than the correlation threshold, no sounding packet is triggered at that time. The process loops back to step 306 and continues to transmit data packets using the most recently calculated beamforming matrix, V. Otherwise, if the measured correlation is less than the correlation threshold, the process loops back to step 302, and a sounding packet is triggered for the generation of an updated beamforming matrix, V, and the previous, stale V is discarded.

Figure 4:
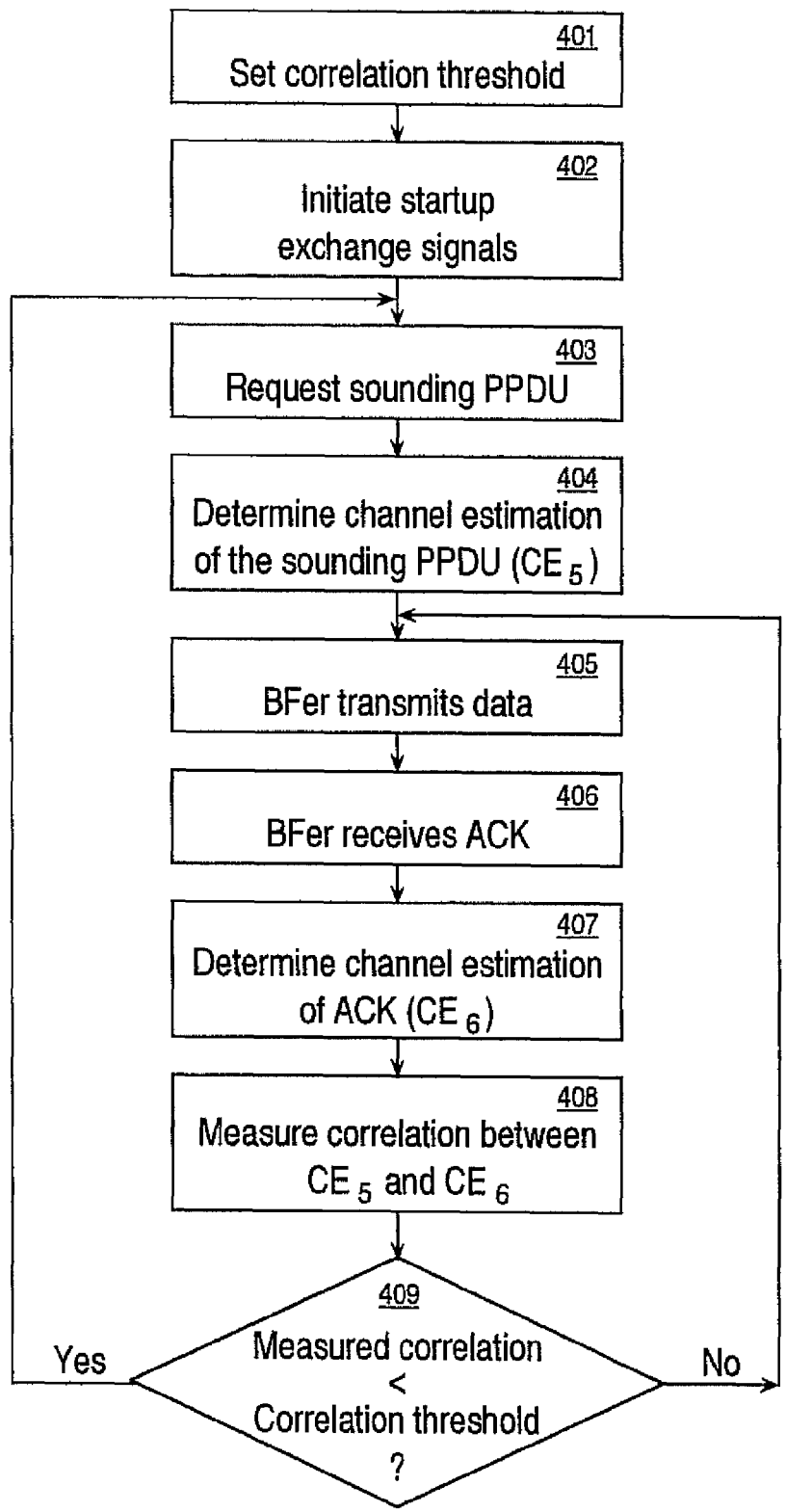
FIG. 4 shows a flowchart describing the process for determining when sounding packets are triggered based on correlations between channel estimations of sounding PPDU and channel estimations of ACK packets.

In another implicit beamforming embodiment, the sounding packets are triggered based on the correlation between the channel estimation of the uplink sounding PPDU that is used to calculate the beamforming matrix, V, and the channel estimation of the ACK packet. More particularly, FIG. 4 shows a flowchart describing the process for determining when sounding packets are requested based on correlations between channel estimations of the uplink sounding PPDU and channel estimations of ACK packets. This process is applicable to implicit beamforming systems. Initially, a correlation threshold is set, step 401. Startup signals are then exchanged to initiate data transmissions between the beamformer and beamformee, step 402. In step 403, a sounding PPDU packet is requested via downlink PPDU. A channel estimation ($CE_5$) is determined based on the sounding PPDU. The beamformer beamforms the raw data signals according the beamforming matrix, V, that was derived from the sounding PPDU. The beamformer steers the beam accordingly and transmits a data packet, step 405. The beamformer receives an ACK packet from the beamformee in step 406 that signifies that the beamformee received the data packet. A channel estimation ($CE_6$) is determined based on the received ACK packet. A correlation is measured in step 408 between the two channel estimations, $CE_5$ and $CE_6$. This measured correlation is compared in step 409 to the correlation threshold. If the measured correlation is less than the correlation threshold set in step 401, this indicates that the channel has undergone a change that is deemed significant. The old beamforming matrix, V, is now stale. A new, updated beamforming matrix is calculated. This is accomplished by the process returning to step 403, which results in a new sounding PPDU being requested and received by the beamformer. This results in a new beamforming matrix, V, being calculated which replaces the old beamforming matrix. Also, a new channel estimation is determined based on the most recent sounding PPDU. This new channel estimation becomes the new $CE_5$, and the process proceeds with the steps 405-409. Otherwise, if the measured correlation is greater than or equal to the correlation threshold, this indicates that the beamformer is allowed to continue transmitting data packets using the old beamforming matrix, V. No new sounding packet is requested at this moment, and the process proceeds with step 405.

Figure 5:
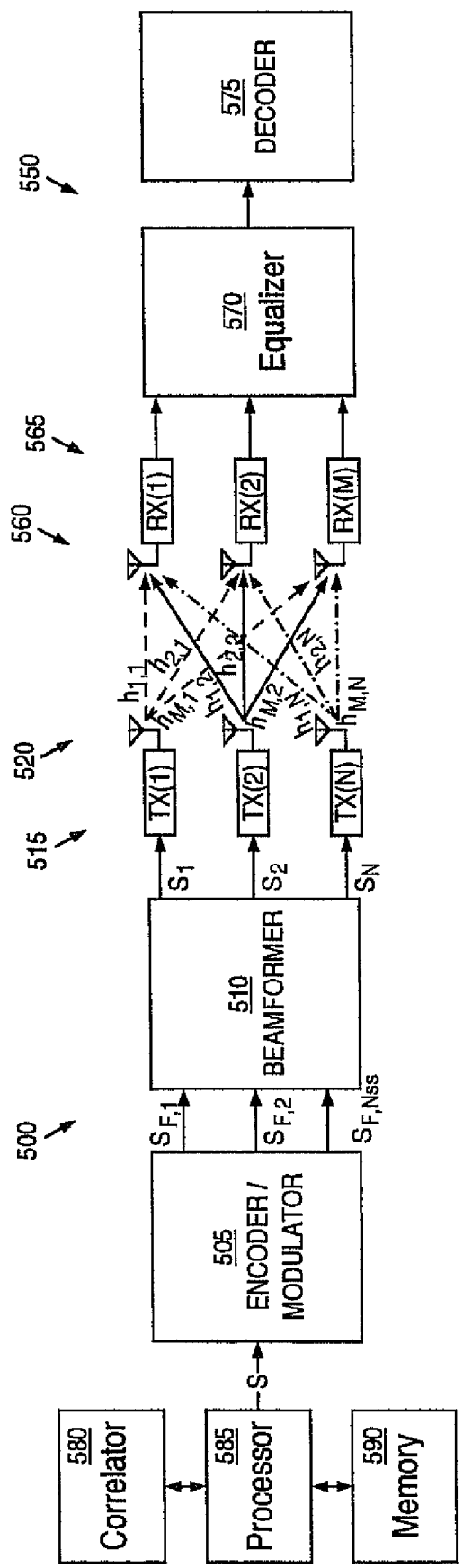
FIG. 5 is a block diagram of one embodiment of a wireless communication device for implementing embodiments of the present invention.

FIG. 5 is a block diagram of one embodiment of a wireless communication device (station) 500 for implementing embodiments of the present invention. The device 500 may be referred to as a multiple-input, multiple-output (MIMO) device with a number N of antennas in an antenna array 520. Also shown is an embodiment of another MIMO device 550 having a number M of antennas in an antenna array 560. In the example of FIG. 1, M is equal to N.

A transmitting device may be generally referred to as a beamformer, and a receiving device may be generally referred to as a beamformee. A device may perform either or both roles, and thus may be referred to as a transmitter or beamformer when it is transmitting, and as a receiver or beamformee when it is receiving.

In FIG. 5, a single block may be described as performing a function or functions; however, in actual practice, the function or functions performed by that block may be performed in a single component or across multiple components, and/or may be performed using hardware, using software, or using a combination of hardware and software. Also, the devices 500 and 550 may include components other than those shown.

Each of the devices 500 and 550 includes a transmit (TX) chain per antenna and a receive (RX) chain per antenna although, in the example of FIG. 5, only the transmit chains 515 of the device 500 and the receive chains 565 of the device 550 are represented. In the example of FIG. 5, an encoder/modulator block 505 and a transmit beamformer 510 are coupled upstream of the transmit chains, and a signal equalizer 570 and a decoder 575 are coupled downstream of the receive chains.

The encoder and modulator block 505 encodes and modulates a signal S from processor 585. In one embodiment, a sub-channel division technique such as orthogonal frequency division modulation (OFDM) is utilized to partition the signal S into Nss spatial signals for F frequency bins (sub-carriers). The beamformer 510 weights and perhaps combines each spatial signal at each sub-carrier $S_{F,1}$, $S_{F,2}$, ..., $S_{F,Nss}$ to generate N different signals $S_1, S_2, ..., S_N$, one signal for each transmit chain. Thus, the beamformer 510 transforms each of the signal $S_{F,1}$, $S_{F,Nss}$ to account for the specific characteristics of each channel associated with each of the antennas in the antenna array 520.

The transmit chains 515 can perform other operations on the steered and weighted signals. For example, the signals output from the beamformer 510 can be converted into digital outputs that are in turn converted into analog baseband outputs, which are then modulated into wireless (e.g., radio frequency, RF) signals that are up-converted from the baseband frequency and transmitted via the antenna array 520.

Signals transmitted from the antenna array 520 pass through individual paths $h_{M,N}$ to the antenna array 560. In one embodiment, since each bin is narrow band, we can use this flat fading channel model. In FIG. 5, $h_{M,N}$ represents the characteristics of a path from the $N^{th}$ transmission antenna to the $M^{th}$ reception antenna. Accordingly, the characteristics $h_{M,N}$ can be represented using complex numbers that quantify, for example, the change in gain and phase of a signal along the respective paths between the transmitter and receiver for a given bin.

Note that, if the device 550 is transmitting, then the channel characteristics would be represented as $h_{M,N}$. Thus, the characteristics of the forward channel along a path between, for example, antenna 2 of the device 500 and antenna 1 of the device 550 would be identified as $h_{1,2}$, which also identifies the reverse channel along the same path from antenna 1 of the device 550 to antenna 2 of the device 500.

The transmitted signals are received at the receiving device 550 via the antenna array 560. The receive chains 565 can perform operations such as filtering, frequency down-conversion to the baseband frequency, and analog-to-digital conversion. The equalizer 570 detects the signals from the receive chains on a per frequency bin basis, and the decoder 575 decodes the equalizer output. The resulting signal is then sent to a processor (not shown) for processing. The user data is then displayed to the user.

A memory 590 stores, among other programs and data, the software used to implement the one or more of the processes described above in determining when sounding packets are to be triggered for transmission or when sounding packets are to be requested for reception. Memory 590 (or a different memory) can be used to retain the correlation threshold value. The processor 585, coupled to memory 590, executes the software which determines when sounding packets are to be triggered. Processor 585 can be a microprocessor, digital signal processor, network chip, specialized ASIC chip, or any other such device that may read and execute programming instructions stored in the memory 590. A control circuit or processor 585 can be used to perform the process described above for determining when sounding packets are to be triggered for transmission. According to the first embodiment described above, the control circuit or processor 585 can determine whether a programmable timing value has elapsed. Every time the timing value elapses, a new sounding packet is triggered for transmission and the timing value resets.

Figure 6:
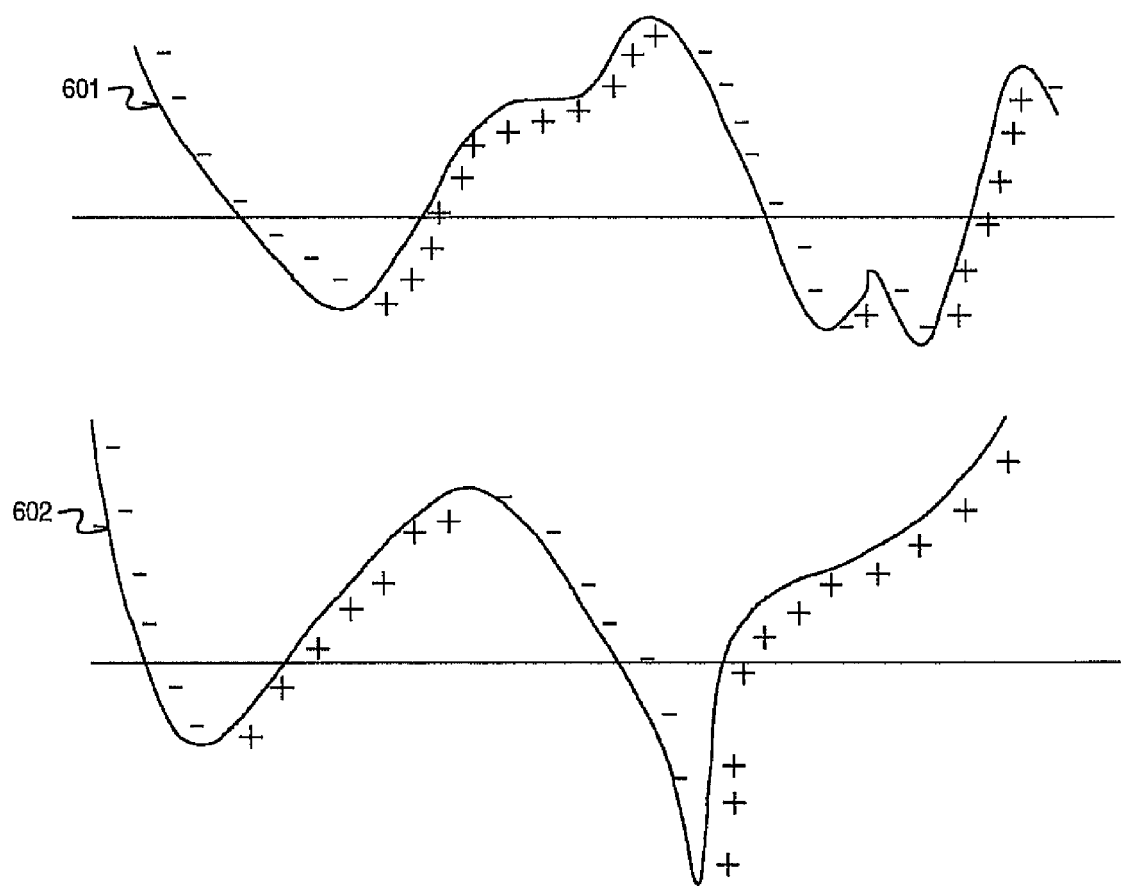
FIG. 6 shows two sets of differential sequences of channel estimations, whereby their polarities are used to determine correlation.

According to other embodiments described above, a correlator 580 is used to perform the correlations between the corresponding pair of channel estimations according to the particular process embodiments described above. In one embodiment, we can further process the channel estimation to get a filtered or a transformed one before performing correlations. Correlator 580 can also be used to perform correlations other than those involved with the triggering of sounding packets. In one embodiment, the correlations can be calculated directly (e.g., real{Hold*conj(Hnew)}). This approach is computationally expensive. Alternatively, the correlations can be performed by comparing the frequency response profiles or bin weighting values. Bin weighting and frequency bins are described in detail in U.S. Pat. No. 7,385,914 entitled, "Apparatus and Method of Multiple Antenna Transmitter Beamforming of High Data Rate Wideband Packetized Wireless Communication Signals, filed Oct. 8, 2003 and also U.S. Pat. No. 7,366,089 entitled "Apparatus and Method of Multiple Antenna Receiver Combining of High Data Rate Wideband Packetized Wireless Communication Signals" filed Oct. 8, 2003, both of which are assigned to the present assignee and both of which are incorporated by reference in their entirety herein. In another embodiment, the correlation can be accomplished by defining a simple function that can identify the similarity of two channel estimations (CEs). For example, a process can be implemented to record the polarity of the gain (or bin weighting) difference of adjacent subcarriers for each channel estimation. The two polarity sequences are then correlated to obtain an approximate channel correlation. An example of a correlation that identifies the similarity of two channel estimations by examining the polarities is shown in FIG. 6. In FIG. 6, the channel estimations of adjacent subcarriers are depicted as 601 and 602. The polarities (e.g., slopes) are represented by the + and − symbols. A rising slope corresponds to a +, whereas a negative slope corresponds to a −. In this particular example, the polarity sequence for function 601 is "−, −, −, −, −, −, −, +, +, +, +, +, +, +, +, +, +, +, +, +, −, −, −, −, −, −, −, +, +, +, +, +, +, −"; and the polarity sequence for function 602 is "−, −, −, −, −, −, +, +, +, +, +, +, +, −, −, −, −, −, −, −, +, +, +, +, +, +, +, +, +, +." A correlation is performed on these two sequences and compared against the correlation threshold to determine whether a sounding packet is to be triggered. Basically, the measured correlation is obtained by comparing two differential sequences, each corresponding to one channel characteristic.

Therefore, an apparatus and method for determining when to generate and transmit sounding packets used to characterize the channel in a transmit beamforming system is described in detail herein. Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

What is claimed is:

1. In a wireless communications device, a method for determining when sounding packets are to be transmitted, comprising:
setting a correlation threshold;
processing at least two channel estimations to determine two corresponding channel characteristics;
measuring a correlation between the two channel characteristics to obtain a measured correlation;
determining whether the measured correlation is less than the correlation threshold; and
transmitting a sounding packet to update a beamforming matrix if the measured correlation is less than the correlation threshold,
wherein the two channel estimations correspond to a channel state information/beamforming matrix/compressed beamforming matrix (CSI/V/CV) feedback packet and to an acknowledge (ACK) packet.

2. The method of claim 1, wherein the wireless communications device operates in an explicit beamforming mode.

3. In a wireless communications device, a method for determining when sounding packets are to be transmitted, comprising:
setting a correlation threshold;
processing at least two channel estimations to determine two corresponding channel characteristics;
measuring a correlation between the two channel characteristics to obtain a measured correlation;
determining whether the measured correlation is less than the correlation threshold; and
transmitting a sounding packet to update a beamforming matrix if the measured correlation is less than the correlation threshold,
wherein the two channel estimations correspond to two acknowledge (ACK) packets.

4. The method of claim 3, wherein the wireless communications device operates in an explicit beamforming mode.

5. The method of claim 3, wherein the wireless communications device operates in an implicit beamforming mode.

6. In a wireless communications device, a method for determining when sounding packets are to be transmitted, comprising:
setting a correlation threshold;
processing at least two channel estimations to determine two corresponding channel characteristics;
measuring a correlation between the two channel characteristics to obtain a measured correlation;
determining whether the measured correlation is less than the correlation threshold; and
transmitting a sounding packet to update a beamforming matrix if the measured correlation is less than the correlation threshold,
wherein the two channel estimations correspond to an acknowledge (ACK) packet and a sounding packet.

7. The method of claim 6, wherein the wireless communications device operates in an implicit beamforming mode.

8. The method of claim 1, wherein the measured correlation is obtained by directly calculating the correlation between the two channel characteristics.

9. The method of claim 1, wherein the measured correlation is obtained by comparing frequency response profiles of the two channels.

10. The method of claim 1, wherein the measured correlation is obtained by comparing bin weighting values of the two channels.

11. The method of claim 1, wherein the measured correlation is obtained by comparing two differential sequences, each corresponding to one channel characteristic.

12. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the measured channel characteristics comprise a channel estimation corresponding to a channel state information/beamforming matrix/compressed beamforming matrix (CSI/C/CV) packet and a channel estimation corresponding to an acknowledge (ACK) packet.

13. The wireless device of claim 12, wherein the wireless device comprises an explicit beamforming system.

14. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the measured channel characteristics correspond to channel estimations of two acknowledge (ACK) packets.

15. The wireless device of claim 14, wherein the wireless device comprises an explicit beamforming system.

16. The wireless device of claim 14, wherein the wireless device comprises an implicit beamforming system.

17. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the measured channel characteristics comprise a channel estimation corresponding to an acknowledge (ACK) packet and a channel estimation corresponding to the sounding packet.

18. The wireless device of claim 17, wherein the wireless device comprises an implicit beamforming system.

19. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the correlation of the measured channel characteristics is obtained by comparing frequency response profiles of two channels.

20. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the correlation of the measured channel characteristics is obtained by comparing bin weighting values of two channels.

21. A wireless device comprising:
a plurality of antennas for transmitting a wireless signal;
a beamforming circuit coupled to the antennas for weighting and combining raw data signals;
a control circuit coupled to the beamforming circuit that determines when to trigger a sounding packet;
a memory coupled to a processor that stores a programmable correlation threshold; and
a correlator coupled to the processor that correlates measured channel characteristics,
wherein the sounding packet is triggered by comparing a correlation of the measured channel characteristics to the programmable correlation threshold, and
wherein the correlation of the measured channel characteristics is obtained by comparing two differential sequences, each corresponding to one channel characteristic.

22. The method of claim 3, wherein the measured correlation is obtained by directly calculating the correlation between the two channel characteristics.

23. The method of claim 3, wherein the measured correlation is obtained by comparing frequency response profiles of the two channels.

24. The method of claim 3, wherein the measured correlation is obtained by comparing bin weighting values of the two channels.

25. The method of claim 3, wherein the measured correlation is obtained by comparing two differential sequences, each corresponding to one channel characteristic.

26. The method of claim 6, wherein the measured correlation is obtained by directly calculating the correlation between the two channel characteristics.

27. The method of claim 6, wherein the measured correlation is obtained by comparing frequency response profiles of the two channels.

28. The method of claim 6, wherein the measured correlation is obtained by comparing bin weighting values of the two channels.

29. The method of claim 6, wherein the measured correlation is obtained by comparing two differential sequences, each corresponding to one channel characteristic.

* * * * *